Dec. 31, 1957 P. S. CARTER 2,818,562

LOOP ANTENNAS FOR TELEVISION SIGNALS

Filed April 23, 1953 2 Sheets-Sheet 1

INVENTOR.
Philip S. Carter

BY Charles H. Brown
ATTORNEY

INVENTOR.
Philip S. Carter
BY Charles H. Brown
ATTORNEY 2,818,562

LOOP ANTENNAS FOR TELEVISION SIGNALS

Philip S. Carter, Port Jefferson, N. Y., assignor, by mesne assignments, to the United States of America as represented by the Secretary of the Army Application April 23, 1953, Serial No. 350,616

16 Claims. (Cl. 343—742)

The invention relates to ultra short wave antennas and, more particularly, to loop antennas having dimensions large in terms of the operating wavelength.

This application is a continuation-in-part of U. S. patent application Serial No. 273,041, filed February 23, 1952, now Patent No. 2,785,396, in turn, a division of U. S. patent application Serial No. 639,998, filed January 9, 1946, now U. S. Patent 2,615,134, issued October 21, 1952.

Various types of antennas have been proposed for radiation and reception of television program signals. The omnidirectional antenna is, of course, preferred for transmitting, i. e., broadcasting, signals and, in general, a highly directional antenna heretofore has been required for receiving the broadcast signals. The presently available omnidirectional receiving antenna has the decided disadvantage that a time consuming orientation procedure must be gone through at every installation. This orientation procedure is expensive because it consumes time and requires highly skilled personnel. Furthermore, with the allocation of more and more frequency channels for television broadcasting, it is desirable that each receiver be able to receive TV programs from more than a few directions.

While omnidirectional antennas are not new, there are no types of nondirectional antennas, either fixed or steerable, which are considered suitable for receiving television program signals on either the well-established very high frequency (V. H. F.) channels or the ultra high frequency (U. H. F.) channels which are now being allocated. This is mainly because the bandwidth of the presently available antennas is decidedly too narrow for the high definition signals involved. Also the impedance matching problem becomes acute with the wide range of frequencies over which reception is desired.

An object of the invention is the further improvement of the band width of antennas.

Another object of the invention is to improve the efficiency of shortwave antennas.

Still another object of the invention is the provision of an improved antenna for receiving TV programs efficiently without presenting objectionably large wind resistance.

A further object of the invention is the provision of an improved antenna which can be installed by untrained personnel in a short space of time.

Still a further object of the invention is the provision of an improved antenna having an omnidirectional radiation of field pattern for broadcasting or receiving television signals over a wide range of frequency channels.

Still a further object of the invention is the provision of an antenna for very high and ultra high frequencies which is mechanically stable and electrically grounded.

Still another object of the invention is the provision of a loop antenna which may be coupled to a coaxial transmission line without the use of line balance converters or similar matching structures.

A still further object of the invention is the provision of a loop antenna array having a wide band width characteristic along a circular field strength pattern.

The foregoing objects and others which may appear from the following detailed description are attained by providing a loop antenna array having a plurality of loops coupled together by a section of transmission line a quarter wavelength, or any odd multiple thereof, long at the frequency of operation and having the field patterns superimposed in phase quadrature relationship. The loop is preferably a single turn arrangement having a circumference of the order of one or a few wavelengths at the operating frequency and made of a large diameter conductor. The antenna array may be coupled to a coaxial transmission line and may utilize elements of the said coaxial transmission line as elements of the loop construction.

The invention will be more fully understood by reference to the following detailed description with reference to the accompanying drawing in which.

Figure 1:
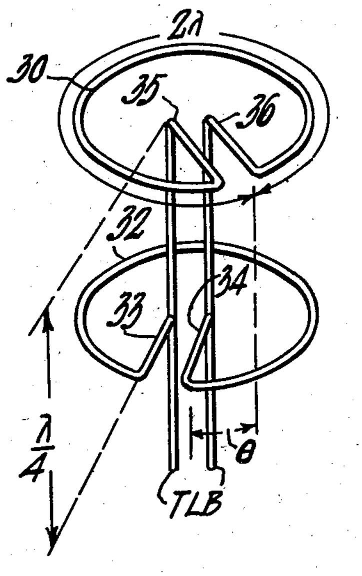
Fig. 1 illustrates an embodiment of the invention wherein a plurality of horizontal loops are vertically stacked to produce a uniform radiation pattern in the horizontal plane.

Referring now to Fig. 1, there is shown a construction of the loop antenna of the invention which may be utilized for broadcast transmission or reception. Two large diameter conductors 30 and 32 are bent into nearly closed circles, each having a circumference of two wavelengths. Between adjacent ends of loop conductor 32 is connected the vertical central two-wire balanced transmission line TLB by means of conductors 33 and 34 parallel to a radius of loop 32 and preferably in the plane of the loop. The balanced transmission line TLB continues vertically a distance equal to an odd multiple of a quarter wavelength to the substantial center of loop 30. It is there connected to the opposing ends of loop conductor 30 by means of conductors 35, 36 parallel to a radius of the loop of conductor 30. The transmission line TLB is twisted between loops 30 and 32 so that the two radii mentioned above lie in vertical planes intersecting along the vertical axis of the antenna at an angle $\theta$ of forty-five degrees. Due to the forty-five degree displacement and the phase-quadrature feeding relationship obtained by the quarter wave spacing between loops 30 and 32, perfect circle distribution of the radiated energy is attained in the horizontal plane. This may be demonstrated as follows:

From one loop alone, the field E is given by the relationship $$E_1 = A \cos 2\phi \qquad (1)$$

where $\phi$ is a measure of the angular displacement around the center of the loop in the horizontal plane. The second loop alone gives a field $E_2$ determined by the expression:

$$E_2 = jA \cos 2(\phi \pm 45°) = \mp jA \text{ sine } 2\phi \qquad (2)$$

Adding the two fields together, the resultant total field is:

$$E_t = A (\cos 2\phi \mp j \text{ sine } 2\phi) = Ae^{\mp j2\phi} \qquad (3)$$

Therefore, the field $/E_t/ = A$ $$(/E_t/ \text{ indicates the magnitude of } E_t) \qquad (4)$$

Any method of energizing the antenna giving a balanced feed may be used. Although the loops in Fig. 1 are shown as having a circumference of 2λ, a pair of loops having a circumference of 1λ may be used, in which case, they are fed in phase quadrature, by the same method as for the 2λ loop, but the feed points are now located at an angle $\theta$ of 90° around the circumference. The phase relationship for the feed is always 90°; the angle $\phi$ being the only variable. For convenience, the angle $\theta$ can be expressed as $$\frac{90^\circ}{n}$$

where $n$ is the number of wavelengths around the circumference of each loop. A similar mathematical consideration shows that the field is again perfectly circular. Any number of antennas may be vertically stacked in order to obtain as much vertical directivity as desired within uniform horizontal field strength.

Figure 2:
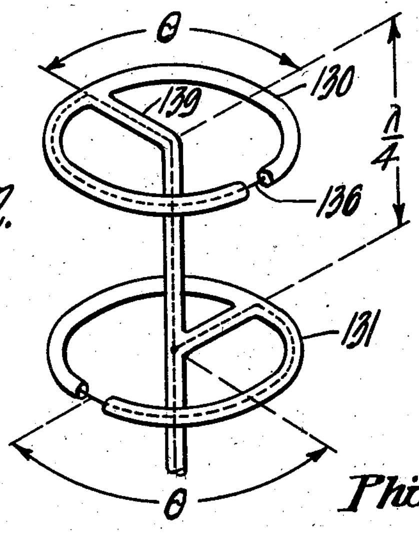
Fig. 2 illustrates a modification of the invention utilizing coaxial transmission line elements.

The arrangement shown in Fig. 2 is fundamentally the same as that shown in Fig. 1 except that coaxial transmission line elements are used to form the antenna. A section of coaxial transmission line 130 substantially two wavelengths long at the operating frequency is bent in the form of a circle having a small gap between the ends of the section. The antenna element thus formed is fed across the gap by means of an inner conductor 136, which is connected to one end of the element and passes into and through the other end of the element to a point diametrically opposite the gap at which point the feeder transmission line 139 is connected. At a quarter wavelength below the section 130 another similar section 132 is located. The two gaps are spaced in the horizontal plane at an angle $\theta$ which is 45° for the two wavelengths section described. If the loop elements 130 and 132 have a circumference of one wavelength at the operating frequency the gaps are spaced apart at an angle $\theta$ of 90°. The feed transmission line 139 to one loop is made to be a quarter wavelength, or any odd multiple thereof, between loops, thereby providing a substantial gain in bandwidths due to the effect of compensating reactance of operating two similar impedance devices in parallel with the transformer action of the quarterwave difference in the length of the feed line. Any number of corresponding elements may be stacked in the vertical direction in order to obtain the desired vertical directivity.

Figure 3:
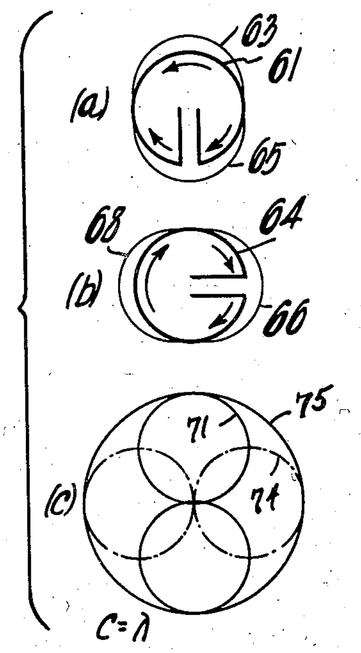
Figs. 3–6 are graphical representations of current distributions and field patterns obtained with the antenna arrays according to the invention.
Figure 4:
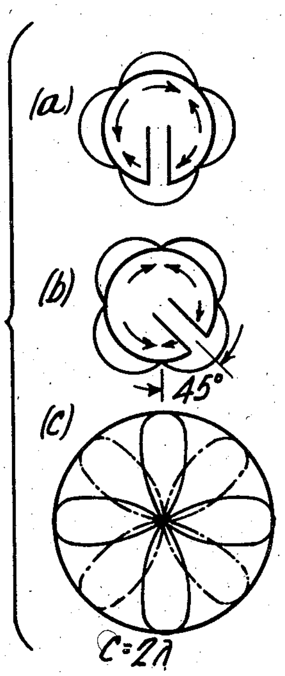
Figure 5:
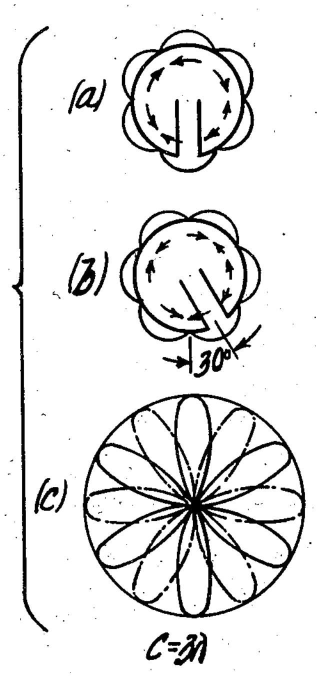
Figure 6:
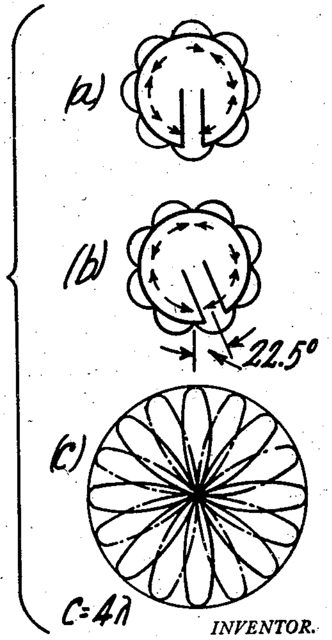

The physical realization of the previous mathematical expressions (1), (2), (3) and (4) are schematically represented in Figs. 3–6. In Fig. 3 (*a*) there is shown a loop conductor 61 of circumference equal to one full wavelength at the operating frequency with which two standing current loops 63 and 65 are obtained. The directions of current flow in the loop are as indicated by the arrows. A similar loop conductor 64 with its feed point rotated 90° relative to that of loop 61 and fed in phase-quadrature is shown with the corresponding current loops 66 and 68 in the relative position as obtained with the arrangements of Figs. 1 and 2. The field pattern obtained with the loop conductor 61 is represented by the solid curve 71 of Fig. 3 (*c*) and that for the loop conductor 64 is represented by the chain-line curve 74. The resultant field pattern is represented by the perfect circle 75. A similar representation for an array of two loop conductors of circumference equal to two wavelengths is shown in Fig. 4. Here the displacement of the feed point of loop (*b*) relative to loop (*a*) is 45° and the two loops are fed in phase-quadrature. The field pattern obtained with loop (*a*) is that shown in the solid curve while the pattern for loop (*b*) is that shown in the dashed curve. When the two loops are placed one above the other and fed in phase-quadrature the resulting pattern is the perfect circle shown. Figs. 5 and 6 show similar current distribution and patterns when the circumferences C are 3 wavelengths and 4 wavelengths, respectively. The displacement of the feed point of loop (*b*) in Fig. 5 is made 30° relative to that of loop (*a*). For the case where the circumference is 4 wavelengths as shown in Fig. 6, the angular displacement of the feed point for loop (*b*) is 22½° relative loop (*a*).

For esthetic reasons, the arrangement of Fig. 2 will no doubt be preferred to that of Fig. 1. This arrangement also lends itself to a simpler and stronger structure as well. The outer conductor of the feed transmission line may be of hardened aluminum or other suitable material so that it may serve as the supporting mast for the array. Phenolic may be used for the insulating members so that a good moisture-tight seal can be had at the same time. A jointed structure may be used to enable quick assembly from parts of suitable shape for packing in small cartons, or the array can be completely factory-assembled so that no skill is required at the installation point. Obviously, a separate mast assembly can be used with a flexible transmission line, either located within or without the supporting tube.

A mathematical development of the theory and properties of a large loop antenna is given in detail in the above mentioned U. S. Patent 2,615,134 and will not be repeated herein. In the instant application, as in the parent application, a vertically polarized wave is defined as one whose magnetic vector is horizontal, that is, the electric vector lies in a vertical plane containing the direction of propagation or ray. The object of this definition is to avoid limiting the direction of propagation to the horizontal. Also in the instant application, the current distribution in the loop is assumed to be sinusoidal as shown in Fig. 12 of the parent application. This is a close approximation to the actual distribution except at the current minimum points where the actual current is finite rather than zero. Regardless of the circumference of the loop, the current distribution will always be symmetrical with respect to the point directly opposite the feed point.

The invention claimed is:

1. A short wave antenna including a plurality of elongated conductors arranged to form substantially closed circles of circumference of a multiple including unity of wavelengths at the operating frequency and concentrically located in substantially parallel planes spaced apart a quarter wavelength at said frequency, the position of adjacent ends of one of said circles being rotated about the concentric axis of said circle by an angle of substantially ninety degrees divided by the number of wavelengths with respect to the position of the adjacent ends of the next adjacent one of said circles, and a transmission line connected across the adjacent ends of said circles, the effective difference in length of said transmission line to said circles being substantially a quarter wavelength at said frequency.

2. A short wave antenna including a pair of elongated conductors arranged to form substantially closed circles of circumference of two wavelengths at the operating frequency and concentrically located in substantially parallel planes spaced apart a quarter wavelength at said frequency, the position of adjacent ends of one of said circles being rotated about the concentric axis of said circle by substantially forty-five degrees with respect to the position of the adjacent ends of the other of said circles, and a transmission line arranged substantially along said concentric axis and connected across the adjacent ends of said circles, the effective difference in length of said transmission line to said circles being substantially a quarter wavelength at said frequency.

3. A short wave antenna system including an elongated conductor curved to form a nearly complete circle having a circumference equal to an integral number of wavelengths at the operating frequency, another conductor arranged a quarter wavelength away from said elongated conductor and curved to form a nearly complete circle of the same circumference, a transmission line having two conductors, connections from the line conductors at one point along the line to respective adjacent ends of one of said curved conductors, and connections from the line conductors at another point along the line to respective adjacent ends of the other of said curved conductors, said two points along the line being separated by a distance substantially equal to an odd multiple including unity of a quarter wavelength at the operating frequency.

4. A short wave antenna including a pair of elongated conductors arranged to form substantially closed circles of circumference of two wavelengths at the operating frequency and concentrically located in substantially parallel planes spaced apart a quarter wavelength at said frequency, the position of adjacent ends of one of said circles being rotated about the concentric axis of said circle by an angle of substantially forty-five degrees with respect to the position of the adjacent ends of the next other of said circles, and a transmission line connected across the adjacent ends of said circles, the effective difference in length of said transmission line to said circles being substantially a quarter wavelength at said frequency.

5. A short wave antenna array including a plurality of lengths of coaxial transmission line arranged to form substantially closed loop antennas of circumference of a multiple including unity of wavelengths at the operating frequency and concentrically located in substantially parallel planes spaced apart a quarter wavelength at said frequency, the position of adjacent ends of one of said loop antenna being rotated about said concentric axis by an angle of substantially ninety degrees divided by the number of wavelengths with respect to the position of the adjacent ends of the next adjacent one of said circles, and a transmission line connected across the adjacent ends of said circles, the effective difference in length of said transmission line to said loop antennas being substantially a quarter wavelength at said frequency.

6. A short wave antenna including a pair of coaxial transmission line sections arranged to form substantially closed circles of circumference of two wavelengths at the operating frequency and concentrically located in substantially parallel planes spaced apart a quarter wavelength at said frequency, said transmission line sections being connected at adjacent ends to form loop antennas, the position of adjacent ends of one of said circles being rotated about the concentric axis of said circle by substantially forty-five degrees with respect to the position of the adjacent ends of the other of said circles, and a coaxial transmission line arranged substantially along said concentric axis and connected to said loop antennas, the effective difference in length of said transmission line to said loop antennas being substantially a quarter wavelength at said frequency.

7. A short wave antenna including a pair of elongated hollow conductors arranged to form substantially closed circles of circumference of a multiple including unity of wavelengths at the operating frequency and concentrically located in substantially parallel planes spaced apart a quarter wavelength at said frequency, the position of adjacent ends of one of said circles being rotated about the concentric axis of said circle by substantially ninety degrees divided by the number of wavelengths with respect to the position of the adjacent ends of the other of said circles, and a coaxial transmission line having sheath conductor connected to the midpoint of each of said hollow conductors and an inner conductor extending into said hollow conductors and passing therethrough to be connected across the adjacent ends of said conductors, the effective difference in length of transmission line to said connection points being substantially a quarter wavelength at said frequency.

8. A short wave antenna including a pair of elongated hollow conductors arranged to form substantially closed circles of circumference of two wavelengths at the operating frequency and concentrically located in substantially parallel planes spaced apart a quarter wavelength at said frequency, the position of adjacent ends of one of said circles being rotated about the concentric axis of said circle by substantially forty-five degrees with respect to the position of the adjacent ends of the other of said circles, and a transmission line having a sheath conductor connected to the midpoint of each of said hollow conductors and an inner conductor extending into said hollow conductors and passing therethrough to be arranged substantially along said concentric axis and connected across the adjacent ends of said circles, the effective difference in length of said transmission line to said connections across the adjacent ends of said circles being substantially a quarter wavelength at said frequency.

9. An antenna system comprising a first loop conductor having adjacent spaced ends, a second loop conductor having adjacent spaced ends, said loop conductors being coaxial in parallel spaced planes with the ends of one angularly displaced from the ends of the other, and transmission line means connected to the spaced ends of both loop conductors.

10. An antenna system comprising a first loop conductor having adjacent spaced ends, a second loop conductor having adjacent spaced ends, said loop conductors being coaxial in parallel spaced planes with the ends of one angularly displaced from the ends of the other, and a transmission line connected from the spaced ends of one loop conductor to the spaced ends of the other loop conductor, said loop conductors being in parallel planes spaced a quarter wavelength at the operating frequency.

11. An antenna system including a plurality of radiation transferring members each comprising an elongated conductive member of length equal to a multiple including unity of the operating wavelength bent to form a loop with the ends of the conductive member adjacent to but spaced from each other, a transmission line comprising two conductors, means connecting one of said conductors to one end of each of said elongated conductive members, and means connecting the other of said conductors to a point on each of said elongated conductive members at a point removed from said one end of each and effective for establishing the energy to be transferred between said adjacent ends of said elongated conductive members, the connections between the conductors of said transmission line and the radiation transferring members being separated by a distance along said transmission line equal to an odd multiple including unity of a quarter wavelength at said operating frequency, said elongated conductive member being arranged one above the other in substantially parallel planes with the gaps between adjacent ends of the elongated conductive members displaced by an angle of substantially 90 degrees divided by the number of wavelengths at the operating frequency.

12. An antenna system including a plurality of radiation transferring members each comprising an elongated conductive member of length equal to a multiple including unity of the operating wavelength bent to form a loop with the ends of the conductive member adjacent to but spaced from each other, a transmission line comprising two conductors, means connecting one of said conductors to one end of each of said elongated conductive members, and means connecting the other of said conductors to a point on each of said elongated conductive members at a point removed from said one end of each and effective for establishing the energy to be transferred between said adjacent ends of said elongated conductive members, the connections between the conductors of said transmission line and the radiation transferring members being separated by a distance along said transmission line equal to an odd multiple including unity of a quarter wavelength at said operating frequency, said elongated conductive member being arranged one above the other in substantially parallel planes with the gaps between adjacent ends of the elongated conductive members displaced by an angle of substantially 90 degrees divided by the number of wavelengths at the operating frequency, said elongated conductive members being arranged in the form of a substantially closed circle.

13. An antenna system including a plurality of radiation transferring members each comprising an elongated conductive member of length equal to a multiple including unity of the operating wavelength bent to form a loop with the ends of the conductive member adjacent to but spaced from each other, a transmission line comprising two conductors, means connecting one of said conductors to one end of each of said elongated conductive members, and means connecting the other of said conductors to a point on each of said elongated conductive members at a point removed from said one end of each and effective for establishing the energy to be transferred between said adjacent ends of said elongated conductive members, the connections between the conductors of said transmission line and the radiation transferring members being separated by a distance along said transmission line equal to an odd multiple including unity of a quarter wavelength at said operating frequency, said elongated conductive member being arranged one above the other in substantially parallel planes with the gaps between adjacent ends of the elongated conductive members displaced by an angle of substantially 90 degrees divided by the number of wavelengths at the operating frequency, said elongated conductive members being arranged in the form of a substantially closed circle, said point of connection of said other conductor to each of said elongated conductive members being located at the end adjacent to said one end.

14. An antenna system including a plurality of radiation transferring members each comprising an elongated conductive member of length equal to a multiple including unity of the operating wavelength bent to form a loop with the ends of the conductive member adjacent to but spaced from each other, a transmission line comprising two conductors, means connecting one of said conductors to one end of each of said elongated conductive members, and means connecting the other of said conductors to a point on each of said elongated conductive members at a point removed from said one end of each and effective for establishing the energy to be transferred between said adjacent ends of said elongated conductive members, the connections between the conductors of said transmission line and the radiation transferring members being separated by a distance along said transmission line equal to an odd multiple including unity of a quarter wavelength at said operating frequency, said elongated conductive member being arranged one above the other in substantially parallel planes with the gaps between adjacent ends of the elongated conductive members displaced by an angle of substantially 90 degrees divided by the number of wavelengths at the operating frequency, said elongated conductive members being arranged in the form of a substantially closed circle, said transmission line being an open wire line passing concentrically of said circles.

15. An antenna system including a plurality of radiation transferring members each comprising an elongated conductive member of length equal to a multiple including unity of the operating wavelength bent to form a loop with the ends of the conductive member adjacent to but spaced from each other, a transmission line comprising two conductors, means connecting one of said conductors to one end of each of said elongated conductive members, and means connecting the other of said conductors to a point on each of said elongated conductive members at a point removed from said one end of each and effective for establishing the energy to be transferred between said adjacent ends of said elongated conductive members, the connections between the conductors of said transmission line and the radiation transferring members being separated by a distance along said transmission line equal to an odd multiple including unity of a quarter wavelength at said operating frequency, said elongated conductive member being arranged one above the other in substantially parallel planes with the gaps between adjacent ends of the elongated conductive members displaced by an angle of substantially 90 degrees divided by the number of wavelengths at the operating frequency, said elongated conductors being hollow for at least a portion of the length thereof, and said one conductor passing thru said hollow portion for connection to said one end.

16. An antenna system including a plurality of radiation transferring members each comprising an elongated conductive member of length equal to a multiple including unity of the operating wavelength bent to form a loop with the ends of the conductive member adjacent to but spaced from each other, a transmission line comprising two conductors, means connecting one of said conductors to one end of each of said elongated conductive members, and means connecting the other of said conductors to a point on each of said elongated conductive members at a point removed from said one end of each and effective for establishing the energy to be transferred between said adjacent ends of said elongated conductive members, the connections between the conductors of said transmission line and the radiation transferring members being separated by a distance along said transmission line equal to an odd multiple including unity of a quarter wavelength at said operating frequency, said elongated conductive member being arranged one above the other in substantially parallel planes with the gaps between adjacent ends of the elongated conductive members displaced by an angle of substantially 90 degrees divided by the number of wavelengths at the operating frequency, said elongated conductors being hollow for at least a portion of the length thereof, and said one conductor passing thru said hollow portion for connection to said one end, said transmission line being a coaxial line and said other conductor being a sheath conductor surrounding said one conductor.

References Cited in the file of this patent

UNITED STATES PATENTS 2,479,337 Fyler ---------------- Aug. 16, 1949